(12) United States Patent
Singh et al.

(10) Patent No.: US 12,388,827 B2
(45) Date of Patent: Aug. 12, 2025

(54) CONTROL OF CLIENT ACCESS TO SERVER-HOSTED RESOURCES

(71) Applicant: Citrix Systems, Inc., Fort Lauderdale, FL (US)

(72) Inventors: Manbinder Pal Singh, Coral Springs, FL (US); Chris Fleck, Fort Lauderdale, FL (US)

(*) Notice: Subject to any disclaimer, the term of this patent is extended or adjusted under 35 U.S.C. 154(b) by 727 days.

(21) Appl. No.: 17/551,671

(22) Filed: Dec. 15, 2021

(65) Prior Publication Data

US 2023/0188525 A1    Jun. 15, 2023

(51) Int. Cl.
    *G06F 21/00*   (2013.01)
    *H04L 9/40*    (2022.01)

(52) U.S. Cl.
    CPC .................. *H04L 63/101* (2013.01)

(58) Field of Classification Search
    CPC .... G06F 21/565; G06F 11/1448; G06F 21/53; G06F 21/554; G06F 2201/84; G06F 2221/033; G06F 11/3604; G06F 11/3612; G06F 2201/81; G06F 21/566
    See application file for complete search history.

(56) References Cited

U.S. PATENT DOCUMENTS

| | | | | |
|---|---|---|---|---|
| 10,681,063 B1* | 6/2020 | Silva | ...................... | G06F 21/577 |
| 10,701,097 B2* | 6/2020 | Madou | ................ | G06F 11/3692 |
| 2006/0195588 A1* | 8/2006 | Pennington | ............. | G06F 21/53 |
| | | | | 709/227 |
| 2010/0212012 A1* | 8/2010 | Touboul | .............. | H04L 63/1441 |
| | | | | 726/26 |
| 2011/0154472 A1* | 6/2011 | Anderson | ........... | H04L 63/1408 |
| | | | | 726/11 |
| 2012/0084349 A1* | 4/2012 | Lee | ........................ | H04L 67/025 |
| | | | | 709/203 |
| 2014/0344891 A1* | 11/2014 | Mullick | ................ | H04L 63/105 |
| | | | | 726/1 |
| 2021/0124628 A1* | 4/2021 | Ding | ........................ | G06N 3/045 |
| 2021/0329096 A1* | 10/2021 | Reddem | .................. | H04L 67/63 |
| 2022/0100874 A1* | 3/2022 | Singh | .................. | G06F 21/6218 |
| 2022/0200977 A1* | 6/2022 | Singh | ....................... | H04L 63/08 |
| 2024/0241943 A1* | 7/2024 | Sherwin, Jr. | ............ | G06F 21/54 |

FOREIGN PATENT DOCUMENTS

AU    2016336006 A1 *   4/2018   .......... G06F 11/3688

* cited by examiner

*Primary Examiner* — Kendall Dolly

(57) ABSTRACT

Described embodiments provide systems and methods for protecting access to a server. A device intermediary to a client and a server may identify a capability of the client to protect access to the server via an application. The device may determine that an element of a user interface provided by the application to the client is to be modified based at least on the capability. The device may modify, responsive to the determination, the element of the user interface to further protect access to the server in accordance with the capability. The device may provide the modified element to the client for the user interface of the application.

20 Claims, 14 Drawing Sheets

CONTROL OF CLIENT ACCESS TO SERVER-HOSTED RESOURCES

FIELD OF THE DISCLOSURE

The present application generally relates to network communications. In particular, the present application relates to systems and methods for controlling client access to server-hosted resources.

BACKGROUND

A client may rely on a resource hosted on a server. The client may attempt to access the resource by sending a request to the server. The server may return a response in connection with the request to the client to provide the resource.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

In a networked environment, a web browser running on a client may access a resource (e.g., a document or other file) hosted on a server using a web application. To access, the web browser may receive a link (e.g., a uniform resource locator (URL)) referencing the resource on the server. When a user interaction (e.g., a click) with the link is detected, the web browser may send a request for the resource from the server. The request may also identify the web application to be used to open the resource. The server may provide both the web application and the resource to the web browser on the client. The web browser on the client may in turn load and present the web browser with the contents of the resource.

While this setup allows for the retrieval of the file, controlling of the client's access to the resource on the server in accordance with a security policy may be insufficient or wholly lacking. There are may be many approaches to addressing the issue of enforcing security policies in this environment. A first approach to handling this issue may be to have an administrator associated with an enterprise, to which the client belongs, may configure web applications to enforce the access controls. Under this approach, however, it may be difficult or impossible to enforce security policies on clients accessing the resources from outside the enterprise. This may be because such clients may be relying on the native applications within the virtual desktop and not the web applications. Furthermore, the administrator the enterprise may lack control over devices outside the enterprise.

A second approach may include use of a uniform resource identifier (URI) protocol intercept in the agent (e.g., the web browser) to enforce access controls. The drawback to this approach may be that one particular type of agent may be specifically configured to use the URI protocol, and other types of agents may thus be not covered by any access controls. As such, to enforce such controls, any links to the resources may have to be accessed through the agent. A third approach may entail registering protocol handlers for processing corresponding types of data with the operating system. While this approach enables enforcing of access control across multiple types of agents, the approach may not be applicable to certain types of operating systems. Furthermore, if the registration is overwritten, the registration may have to be repeated to re-register the protocol handler.

In addition, a fourth approach may involve installation of an extension on the agent to enforce the security policies. The extension may not be able to have visibility into an inline frame on a webpage, and as such may have limited applicability. A fifth approach may be to include protections in local applications on the client or the native application within the virtual desktop. The number of applications to which the protection can be added, however, may be limited, thereby reducing the utility of the application. A sixth approach may entail use of a computer-vision based technique in the agent or the application to carry out the access controls. But this approach may be computationally expensive, consuming significant amounts of computing resources and thereby reducing the overall performance of the client.

To address these and other technical challenges, a gateway intermediary to the client and the server may modify user interface elements on the application while accessing the resources hosted on the server. To that end, the gateway (also referred herein as an appliance) may be configured with security policies specifying access controls based on the context or capabilities associated with the client attempting to access the resources hosted on the server. Upon connecting with the client, the gateway may scan the client for the capabilities associated with the client using the agent on the client. The capabilities may include various factors, for example: a device profile of the client, protections enabled for local applications, a management status indicating whether the client belongs to an enterprise, and protocol handlers on the client, among others. The capabilities may be used by the gateway to determine which controls to apply in accordance with the security policies.

From the connection, the gateway may receive a request for the resource on the server from the client. The request may be generated by the client in response to a user interaction with a link (e.g., a URL) referencing the resource. The link may have been provided to the client from the server, the gateway, or another source, and may include the reference to the resource itself and the application to be used to access the resource. For instance, the link may contain a substring identifying the application and another substring identifying a file to be opened using the application. Upon receipt, the gateway may forward and direct the request to the server. The server may in turn process the request and generate a response including one or more elements defined for a user interface of the application for accessing the resource. Each element may, for example, correspond to a document object model (DOM) tree element, and may include a protocol handler defining a functionality of the element. Once generated, the server may transmit the response to the gateway.

With receipt, the gateway may parse the response to identify the elements for the user interface of the application. For each element, the gateway may check the capabilities of the client with the security policy to determine whether the element and the protocol handler therein in the response is to be modified. The security policy may specify that that for certain factors of capabilities, the protocol handler or the element is to be disabled, removed, hidden, replaced, or otherwise changed. For example, if the protocol handler for the application is in the element, the security policy may specify that the original protocol handler is to be replaced with a protocol handler of the gateway to access the resource. If the client is identified as not managed by the enterprise and the application is accessible in the virtual desktop, the security policy may specify that the client is to launch the virtual desktop to access the resource. If the client is identified as not managed and the virtual desktop is not available, the security policy may specify that a graphical user interface element for accessing a file in a web application is to be hidden. In this way, the user may be prevented from viewing the element and may not be able to trigger the functionality. In some cases, the policy may specify that a parent or ancestor element of the graphical user interface element for accessing may be hidden, disabled, or removed.

Continuing on, if the client is identified as managed, the security policy may also permit the accessing of the file with an application local to the client. If the client is identified as not managed and the virtual desktop is not used to access the resource, the security policy may specify that the element for "open using desktop application" may be disabled, removed, or hidden. If the client is identified as attempting to access the resource through the virtual desktop and the native application is available within the virtual desktop (e.g., on a disk image), the security policy may specify that the application native to the virtual desktop is to be installed to access the resource. If the client is identified as attempting to access the resource through a web application and there is no native application for opening the resource, the security policy may specify that the virtual desktop is to be launched to access. The security policy may specify a whole host of other risk factors associated with the capabilities of the client to define the countermeasures to be taken.

In accordance with the security policy, the gateway may maintain or modify the elements of the response. Upon completion of the check, the gateway may forward the response to the client. The client in turn may receive and load the elements for the user interface of the application as defined in the response. When a user interaction with an element for opening the resource in an application is detected, the client may process the interaction in accordance with the protocol handler in the element of the user interface. In processing, the client may extract arguments identifying the application and the resource to be accessed, and pass the arguments from the agent to the protocol handler. The processing may be modified in accordance with the security policy.

If the protocol handler has been maintained to execute a native application local to the application as the client is identified as managed, the client may launch the native application. The native application may fetch the resource from the server, and open and load the resource. If the protocol handler has been modified to launch a virtual desktop as the client is identified as not managed, the client may initiate a request to launch the virtual desktop to open an application to access the resource. The gateway may facilitate the establishment of the virtual desktop. With the establishment of the virtual desktop, the client may send a request for the resource through the virtual desktop supported by the gateway. Upon receipt, the client may launch a native application within the virtual desktop to load the resource.

By modifying the elements of the user interface for the application, the gateway may protect and control access to the resources hosted on the server, thereby improving the security of the overall network including the server and the integrity of the resources thereon. In this manner, the gateway may also widen the applicability of the security policy for access controls beyond the limitations in the other enumerated approaches. Since the security of the resources may be maintained outside the enterprise, the gateway may further increase the availability of the resources of the server beyond the clients associated with the enterprise. The gateway therefore may enhance the utility of the resources, the servers, and the clients.

Aspects of the present disclosure are directed to systems, methods, and non-transitory computer readable media for protecting access to a server. A device intermediary to a client and a server may identify a capability of the client to protect access to the server via an application. The device may determine that an element of a user interface provided by the application to the client is to be modified based at least on the capability. The device may modify, responsive to the determination, the element of the user interface to further protect access to the server in accordance with the capability. The device may provide the modified element to the client for the user interface of the application.

In some embodiments, the device may establish a session between the client and the server to provide the client access to a resource via the application hosted on the server, in response to an interaction with the modified element. In some embodiments, the device may in associate the capability of the client with a modification to be performed on the user interface element of the user interface for the application.

In some embodiments, the device may determine a risk score for the client in protecting access to the server via the application. In some embodiments, the device may determine that the element is to be modified, responsive to the risk score being above a threshold. In some embodiments, the device may identify the capability including at least one of: a device profile of the client, an application profile of the application, a network profile of a network with which the client is connected, or a configuration of a handler on the client.

In some embodiments, the device may identify, in a response from the server to the client, a handler defining a function of the element to access a second server different from the server. In some embodiments, the device may modify a handler defining a function of the element by at least one of removal, hiding, disabling, or replacing the handler. In some embodiments, the device may configure the element of the user interface of the application hosted on the server to further protect access to a resource hosted on the server by at least one of removal, hiding, disabling, or replacing the element.

In some embodiments, the device may forward, from the server to the client, a response including the modified element of the user interface for the application. In some embodiments, the device may provide, responsive to an invocation of the modified user interface element, the client access to a resource via the application hosted on the server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, prin- FIG. 1A is a block diagram of a network computing system, in accordance with an illustrative embodiment;

Figure 1A:
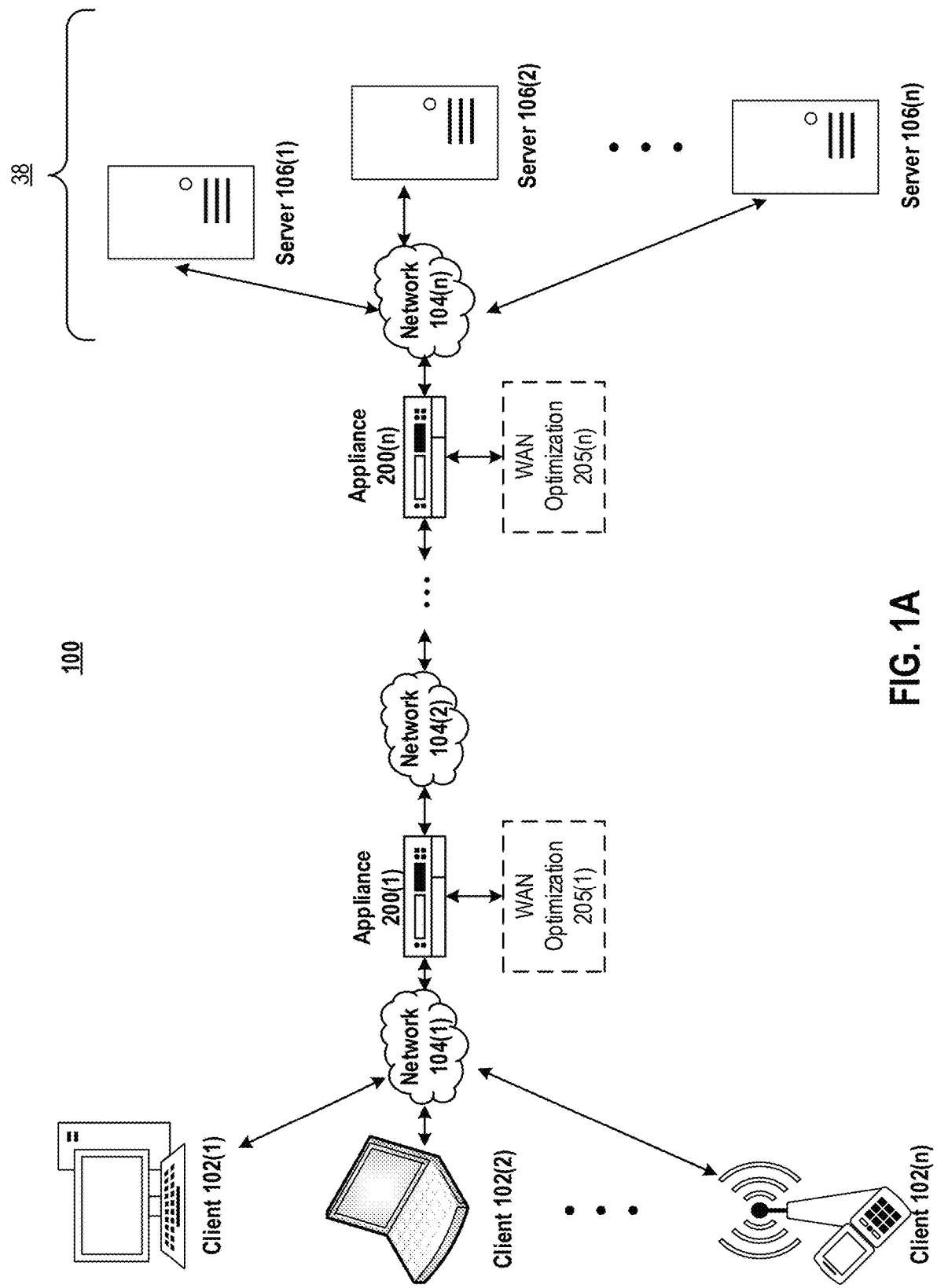
FIG. 1B is a block diagram of a network computing system for delivering a computing environment from a server to a client via an appliance, in accordance with an illustrative embodiment.
FIG. 1C is a block diagram of a computing device, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for protecting access by clients to server-hosted resources.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104(n) (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc., of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc., of Fort Lauderdale, FL.

Figure 1B:
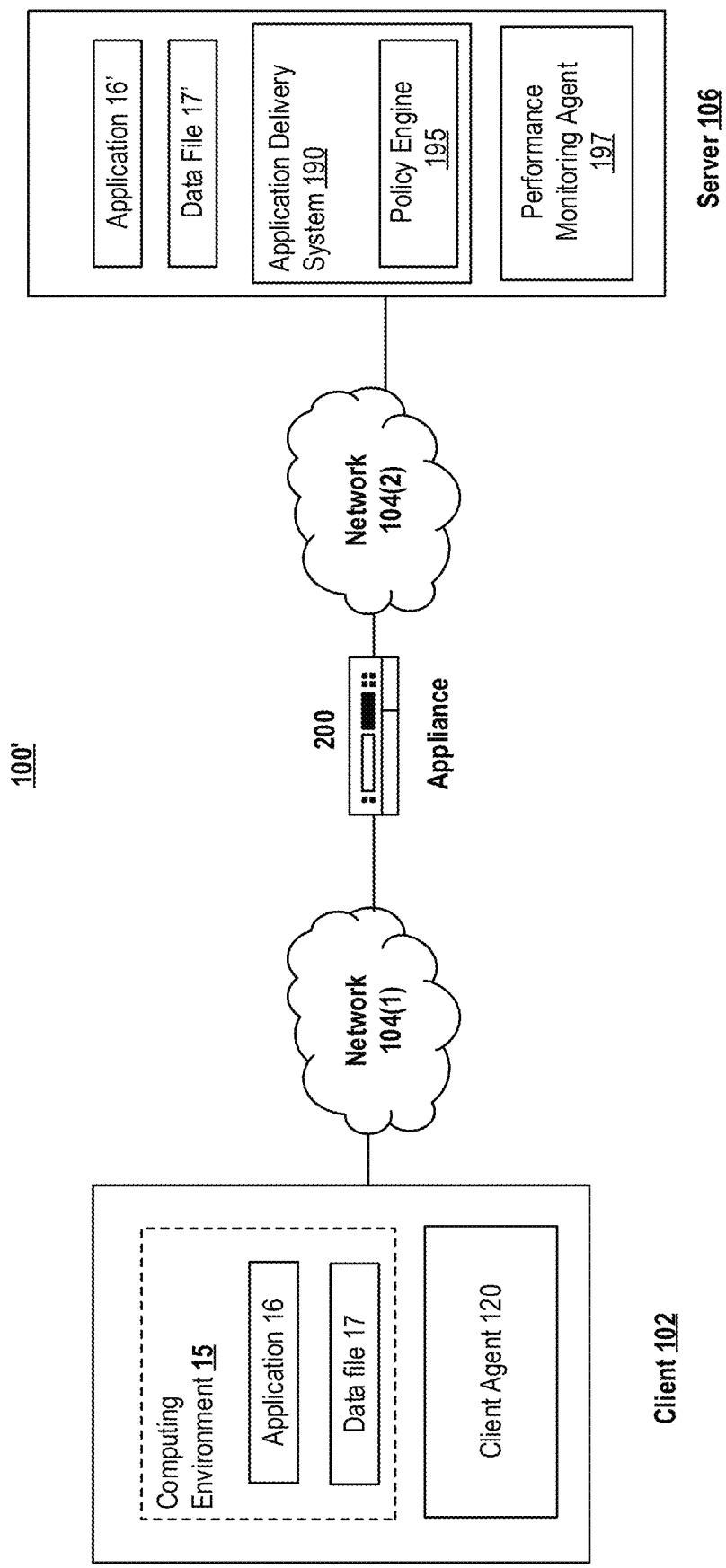

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16, that accesses, processes, or uses a data file 17. Computing environment 15, application 16, and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or (6) other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 102 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc., of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc., of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and/or appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
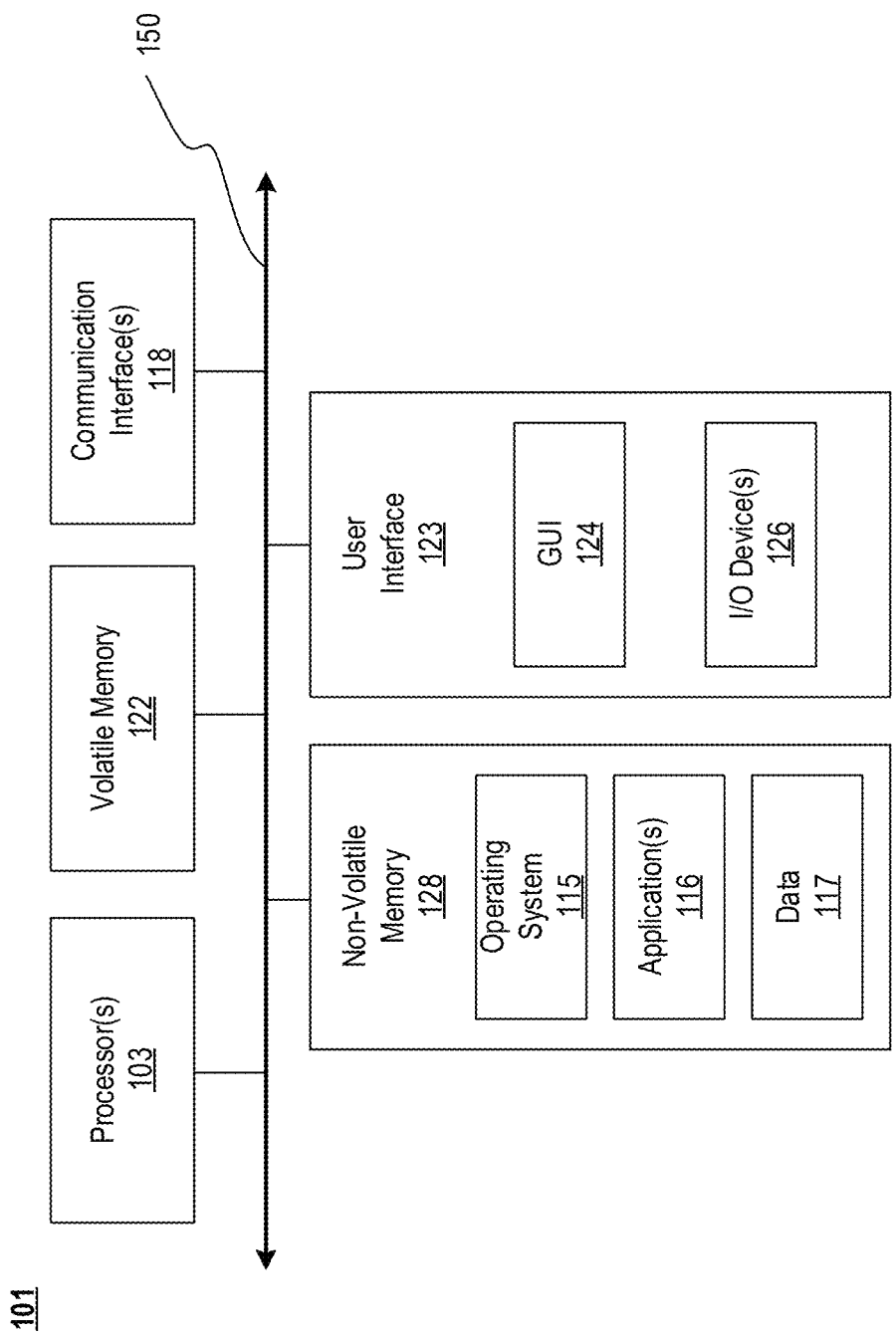

As shown in FIG. 1C, computer 101 may include one or more processor(s) 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communication interface(s) 118, and communication bus 150. User interface 123 may include graphical user interface (GUI) 124 (e.g., a touchscreen, a display, etc.) and one or more input/output (I/O) device(s) 126 (e.g., a mouse, a keyboard, etc.). Non-volatile memory 128 stores operating system 115, one or more application(s) 116, and data 117 such that, for example, computer instructions of operating system 115 and/or application(s) 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106, and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors.

Communication interface(s) 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
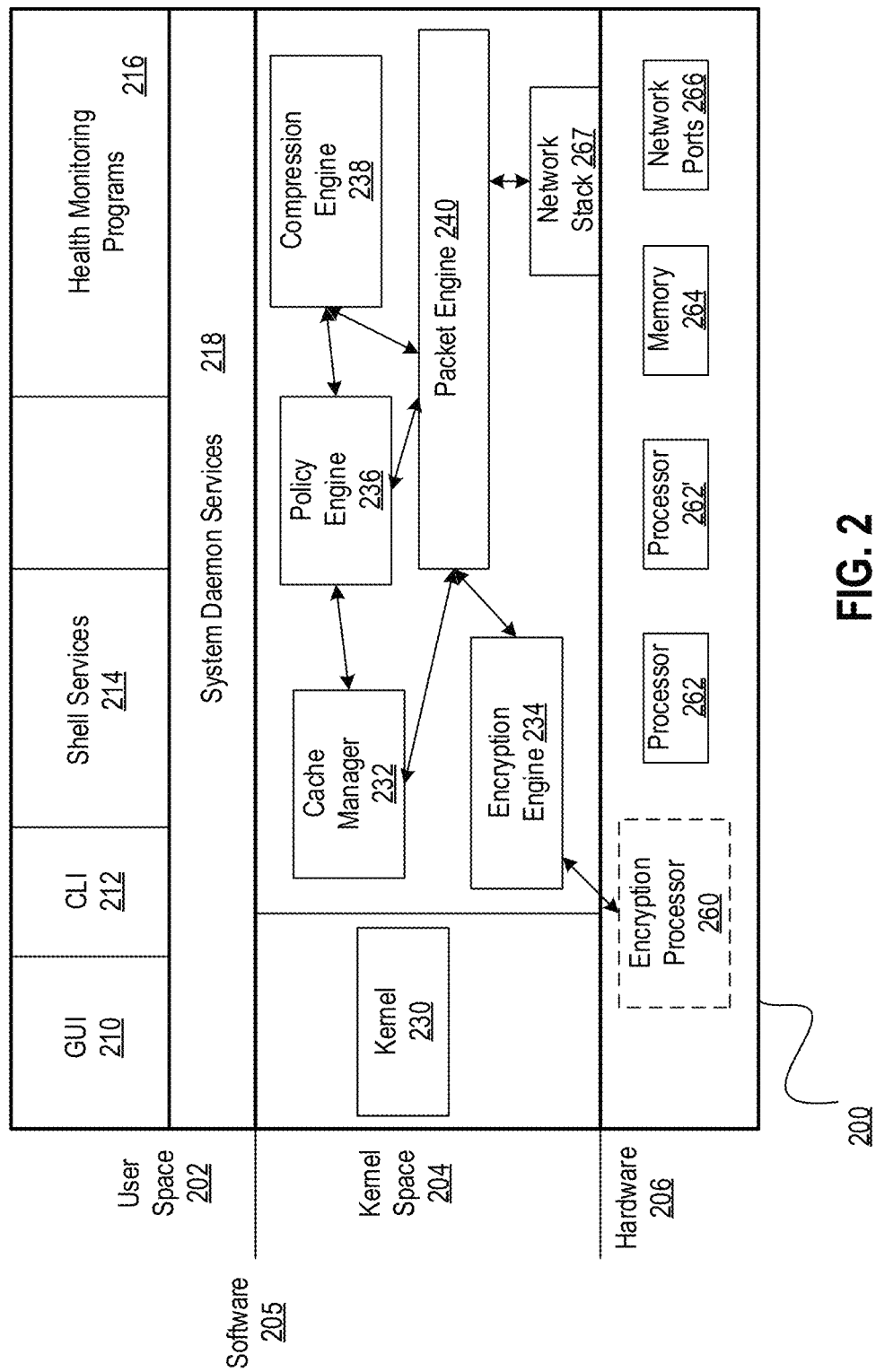
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP-based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236, and 238 run in the core address space of the operating system of appliance 200, which may reduce the number of data transactions to and from the memory and/or context switches between kernel mode and user mode, for example since data obtained in kernel mode may not need to be passed or copied to a user process, thread, or user level data structure.

Cache manager 232 may duplicate original data stored elsewhere or data previously computed, generated, or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliance 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stack 267 to send and receive network packets via network ports 266. Packet engine 240 may operate in conjunction with encryption engine 234, cache manager 232, policy engine 236, and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports, and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service, or task is active and currently running, check status, error or history logs provided by any program, process, service, or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed, or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route, or load-balance any communications provided via any protocol carried by the transport layer.

In some embodiments, client agent 120 is implemented as an Independent Computing Architecture (ICA) client developed by Citrix Systems, Inc., of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, FL.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
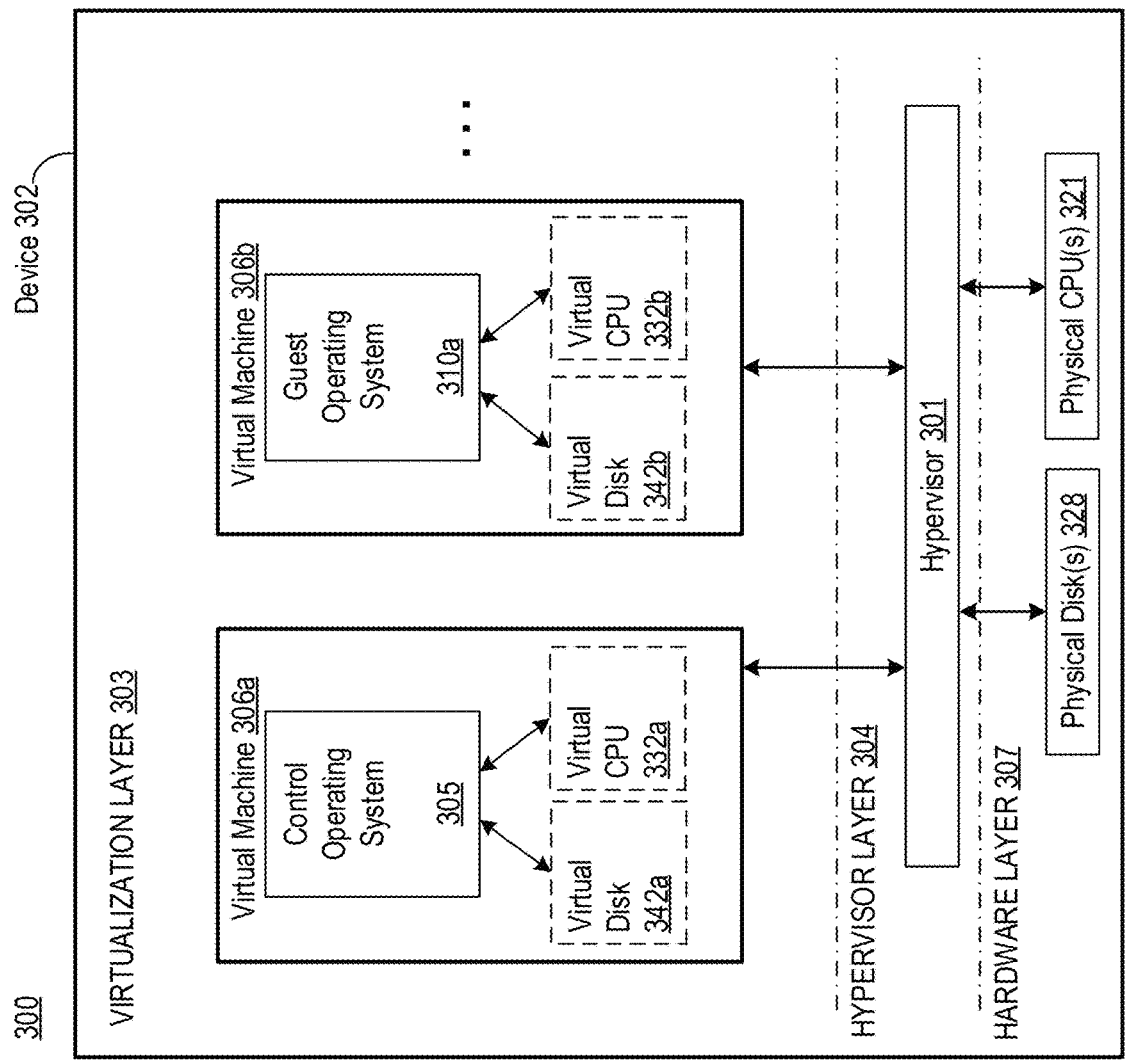
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106, or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2, and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load, or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106, or appliance 200, such that the functionality may be implemented across multiple devices, such as a cluster of computing devices, a server farm, or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
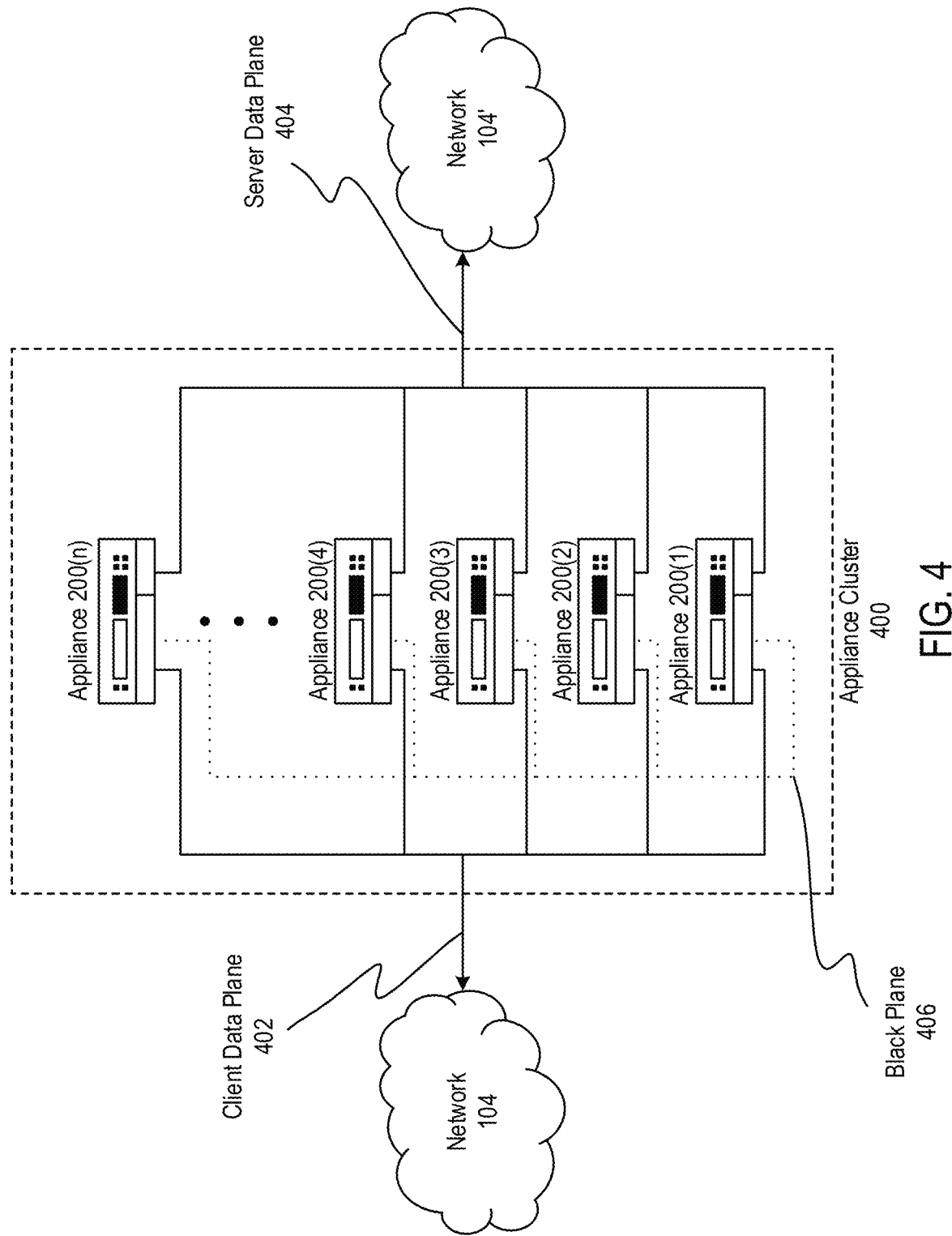
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or black plane 406. Black plane 406 may enable inter-node or inter-appliance control and configuration messages, for inter-node forwarding of traffic, and/or for communicating configuration and control traffic from an administrator or user to cluster 400. In some embodiments, black plane 406 may be a physical network, a VPN or tunnel, or a combination thereof.

Figure 5:
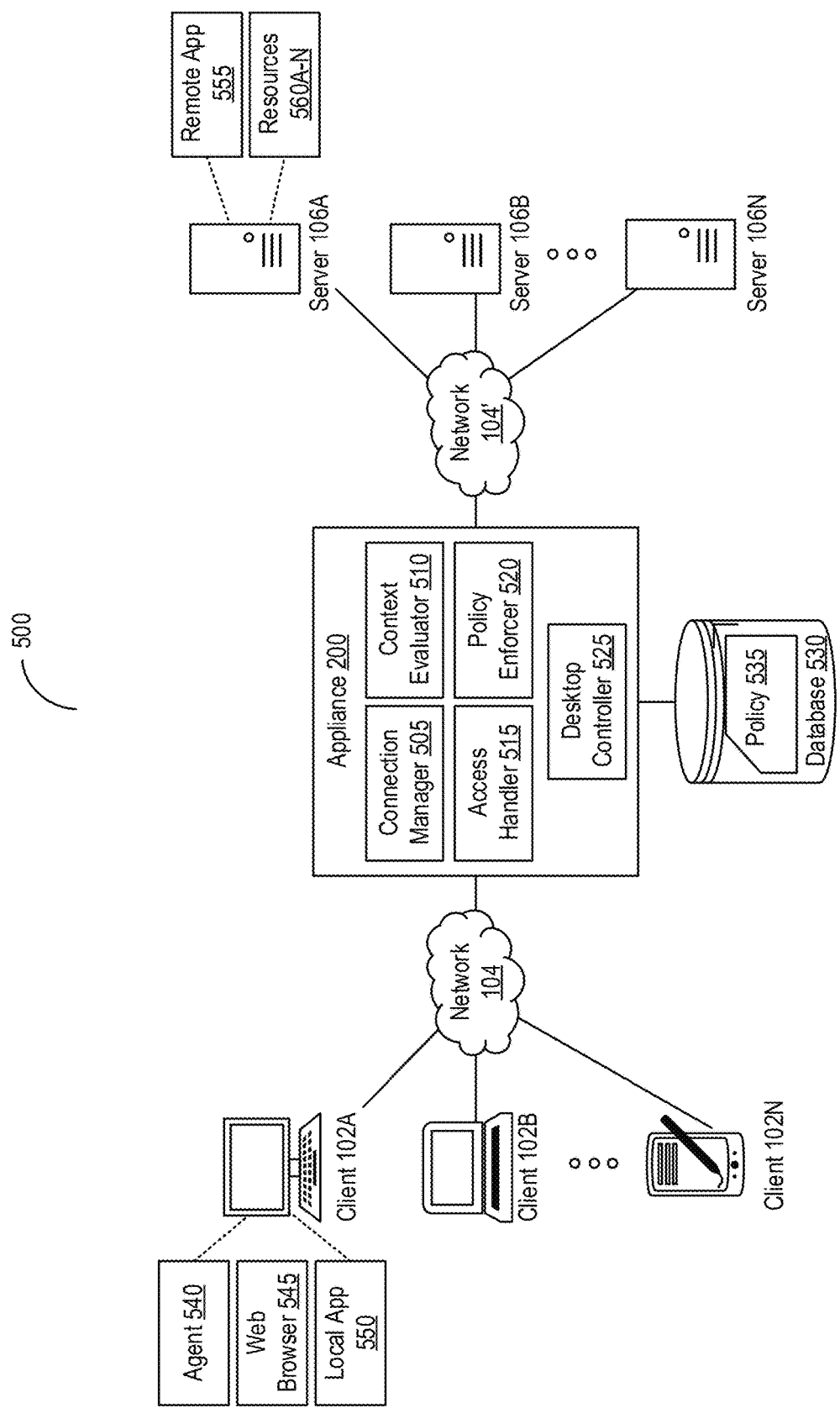
FIG. 5 is a block diagram of an embodiment of a system for protecting access by clients to server-hosted resources in accordance with an illustrative embodiment.

E. Systems and Methods for Protecting Access by Clients to Server-Hosted Resources Referring now to FIG. 5, depicted is a system 500 for protecting access by clients to server-hosted resources. In overview, the system 500 may include one or more clients 102A-102N (hereinafter generally referred to as clients 102), one or more servers 106A-106N (hereinafter generally referred to as servers 106), and at least one appliance 200 deployed between the clients 102 and the servers 106. The system 500 may include at least one network 104 to communicatively couple the clients 102 with the appliance 200 and at least one network 104' to communicatively couple the appliance 200 with the servers 106. The appliance 200 may include at least one connection manager 505, at least one context evaluator 510, at least one access handler 515, at least one policy enforcer 520, at least one desktop controller 525, and at least one database 530, among others. The database 530 may store, maintain, or otherwise include at least one policy 535. At least one of the clients 102 may include at least one agent 540, at least one web browser 545, and at least one local application 550, among others. In some embodiments, the agent 540 may be an instance of the client agent 102 detailed above. At least one of the servers 106 may include at least one remote application 555 and a set of resources 560A-N (hereinafter referred generally as resources 560).

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 6A:
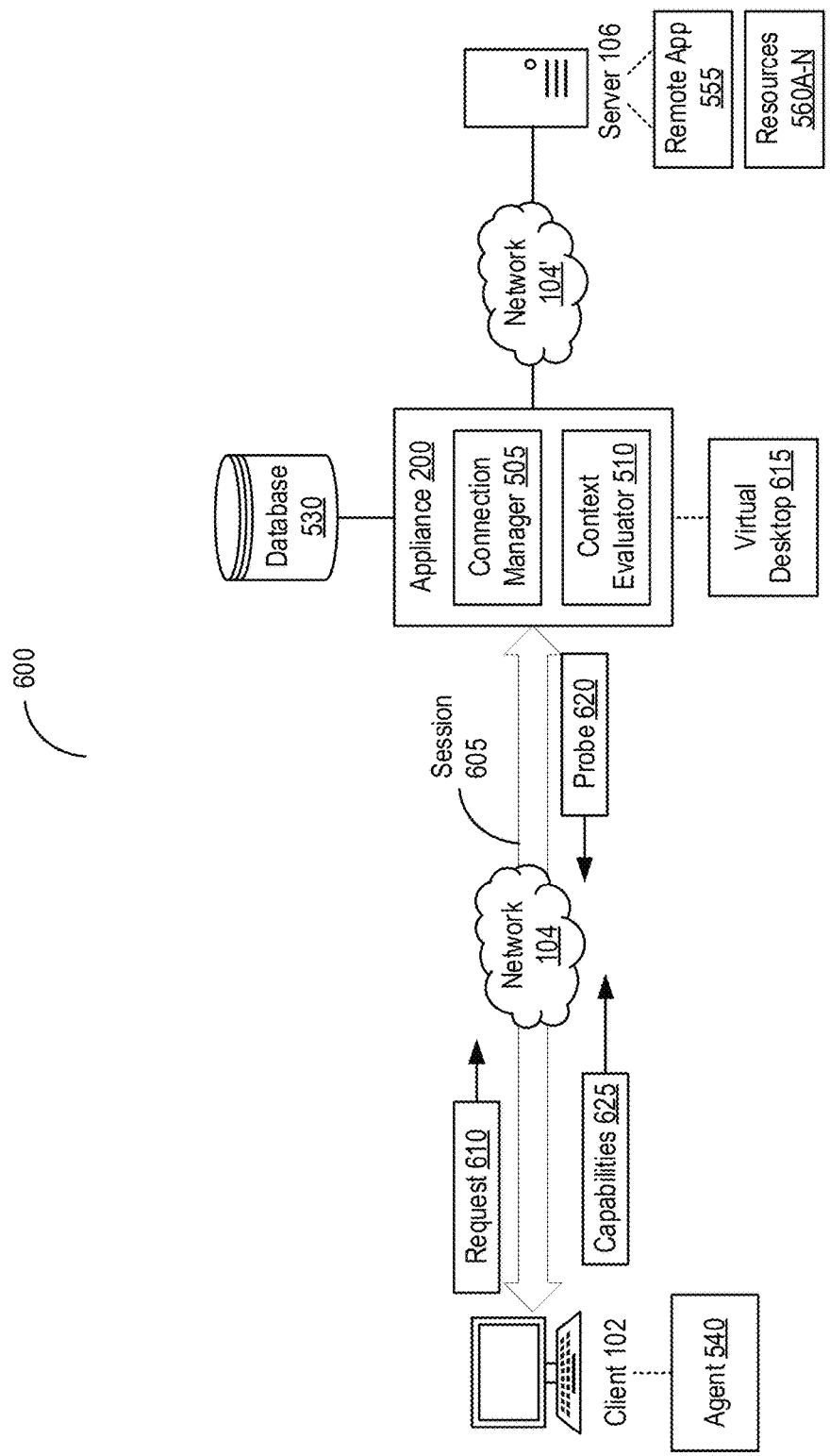
FIG. 6A is a block diagram of an embodiment of a process for probing capabilities of a client in the system for protecting access in accordance with an illustrative embodiment.

Referring now to FIG. 6A, depicted is a block diagram a process 600 for probing capabilities of the client 102 in the system 500 for protecting access. The process 600 may correspond to or include operations performed in the system 500 to initiate a connection with the appliance 200. Under the process 600, the agent 540 executing on the client 102 may initiate and establish a session 605 with the appliance 200 over the network 104. The session 605 may be for encrypting and securing communications between the client 102 and the appliance 200 to access the server 106. The session 605 may facilitate the provision of the remote application 555 or the resources 560 from the server 106 to the client 102. In some embodiments, the session 605 may facilitate the provision of the remote application 555 or the resources 560 via a virtual desktop 615 supported by the appliance 200. For example, the agent 540 may establish the session 605 to retrieve a workspace or a remote desktop supported by the appliance 200 to access cloud-based resources in the network 104', such as the remote application 555 and the resources 560 on the server 106. Access by the client 102 to the remote application 555 and the resources 560 may be controlled by the appliance 200 as detailed herein below.

To initiate the session, the agent 540 may provide, send, or otherwise transmit a request 610 to connect with the appliance 200. The request 610 may identify the appliance 200 with which to establish the session. In some embodiments, the request 610 may identify the remote application 555 or the resources 560 to be accessed via the agent 540 on the client 102. In some embodiments, the request 610 may include an indicator whether the virtual desktop 615 is to be provided over the session 610 or may identify the virtual desktop 615 itself to be accessed via the session 605. The request 610 may identify the client 102, a user of the client 102 (e.g., an account identifier), and authentication credentials for the user, among others. In some embodiments, the agent 540 may generate the request 610, in conjunction with the launching of the agent 540 on the client 102. For example, upon opening the agent 540, a user of the client 102 (e.g., an account identifier) and authentication credentials for the user into a user interface of the agent 540 to login to the appliance 200. Using the input, the agent 540 may generate the request 610 to include the identifier for the user and the authentication credentials. With the generation of the request 610, the agent 540 may send the request 610 to the appliance 200. In some embodiments, the agent 540 may transmit the request 610 without user input.

The connection manager 505 on the appliance 200 may in turn retrieve, identify, or otherwise receive the request 610 from the client 102. Upon receipt, the connection manager 505 may complete the establishment of the session 605 between the client 102 and the appliance 200. In some embodiments, the connection manager 505 may parse the request 610 to identify the applications 555 or the resources 560 to be accessed at the agent 540. The connection manager 505 may provide the client 102 access to the applications 555 or the resources 560 through the session 605. The remote application 555 may include or correspond to a resource, a program, or executable hosted on the server 106 or otherwise accessible via the appliance 200. The remote application 555 may include a variety of applications, such as word processor, an image editor, a video editor, a web browser, and an electronic mail agent, among others. In some embodiments, the remote application 555 may be a web application to be loaded via the web browser 545. In some embodiments, the remote application 555 may be a virtualized application (e.g., Software as a Service (SaaS) application) to be loaded via the virtual desktop 615. The resources 560 may include data accessible via the remote application 555 or another application on the client 102, such as the web browser 545 or the local application 550. The data in the resources 560 may include, for example, text, image, video, audio, and other data, or any combination thereof. In some embodiments, to signal completion of establishment, the connection manager 505 may return, send, or otherwise transmit an acknowledgment response to the client 102.

In some embodiments, the connection manager 505 may check whether the identifier for the user and the authentication credentials in the request 610 matches with the identifier for the user and the authentication credentials maintained by the appliance 200. The connection manager 505 may parse the request 610 to identify the identifier (e.g., account identifier) for the user of the client 102 and the authentication credentials. The connection manager 505 may check the identifier for the user and the authentication credentials in the request 610 with the identifier for the user and the authentication credentials maintained by the appliance 200. If the identifier for the user and the authentication credential are validated from the check, the connection manager 505 may proceed to establish the session 605. Otherwise, if not validated, the connection manager 505 may refrain from establishing the session 605, send a response indicating failure to validate the identifier for the user and the authentication credential to the client 102, and repeat the process again.

In some embodiments, the connection manager 505 may provide the virtual desktop 615 via the session 605 for the agent 540. The provision may be in response to the request 610 indicating that the virtual desktop 615 is to be provided. In some embodiments, the connection manager 505 may select an already existing virtual desktop 615. The existing virtual desktop 615 may be identified using the identifier in the request 610 or using the remote application 555 and the resources 560 identified in the request 610. In some embodiments, the connection manager 505 may instantiate, launch, or otherwise create the virtual desktop 615. The virtual desktop 615 may be in accordance with a communications protocol for the provision of the remote application 555 and the resources 560 from the server 106 to the client 102, such as the Remote Desktop Protocol (RDP) or the Independent Computing Architecture (ICA), among others.

With the establishment of the session 605, the context evaluator 510 on the appliance 200 may provide, send, or otherwise transmit a probe 620 to the client 102 to determine or identify one or more capabilities 625 (sometimes herein referred to as context) associated with the client 102. In some embodiments, the identification of the capabilities 625 may be sent by the client 102 with the initial request 610. In some embodiments, the context evaluator 510 may transmit the probe 620 in response to establishment of the session 605. In some embodiments, the context evaluator 510 may have visibility to the capabilities 625 associated with the client 102 via the agent 540 and the session 605. The probe 620 sent by the context evaluator 510 may specify which type of capabilities 625 are to be identified.

The capabilities 625 may identify or include, for example: a device profile of the client 102; an application profile of the local application 550 or the remote application 555 to be used to access the resources 560; a network profile of the network 104 to which the client 102 belongs or is accessing the appliance 200; and a configuration of a protocol handler on the client 102, among others. The device profile may identify a device type of the client 102, such as one of mobile phone, laptop, desktop, or smart television. The device profile may identify a management status of the client 102, such as whether the client 102 is a personal device (also herein referred to as a "bring your own device" (BYOD)) or managed by an administrator of an enterprise (also herein referred to as a "managed device"). The device profile may identify whether the client 102 has launched the virtual desktop 615 in the session 605.

In addition, the application profile may include an identifier for the application, such as the local application 550 or the remote application 555. The application profile may identify which types of files (e.g., resources 560) can be opened using the application. The application profile may also identify a security or application protection feature provided by the application, such as anti-keylogging function, an anti-screenshot feature, or data exfiltration prevention, among others. The network profile may identify whether the network 104 is a secure network (e.g., a virtual private network (VPN), intranet, enterprise network, or branch office network) or a public network (e.g., the Internet), among others. The configuration of the protocol handler may identify which protocol handler (e.g., on the web browser 545) is to be used to handle accessing of the remote application 555 or the resources 560.

The agent 540 on the client 120 may in turn retrieve, identify, or otherwise receive the probe 620 from the appliance 200. Upon receipt, the agent 540 may gather, obtain, or identify the capabilities 625 to be identified as specified by the probe 620 from the client 102. In gathering, the agent 540 may inspect the client 102 to determine the device profile for the client 102. For instance, the agent 540 may access an operating system on the client 102 to retrieve device type and management status. The agent 540 may also identify the application profile for the local application 550 capable of accessing the resources 650. In addition, the agent 540 may identify the application profile for the remote application 555 through the session 605 (e.g., via the virtual desktop 615). The agent 540 may further determine the network profile by accessing the network 104 to which the client 102 is connected. The agent 540 may also identify which protocol handlers are configured to handle the accessing the remote applications 555 or the resources 560 (e.g., from scanning the web browser 545). With the gathering, the agent 540 may return, send, or transmit the identifications of the capabilities 625 to the appliance 200.

In sending the probe 620, the context evaluator 510 may in turn retrieve or otherwise identify the identification of the capabilities 625 from the client 102. Upon receipt, the context evaluator 510 may store the identification of the capabilities 625 onto the database 530. In some embodiments, the context evaluator 510 may associate the capabilities 625 with the client 102, the agent 540 on the client 102, the session 605 established between the client 102 and the appliance 200, or the virtual desktop 615 provided to the client 102. The context evaluator 510 may store the association with respect to the capabilities 625 on the database 530. The context evaluator 510 may maintain the capabilities 625 and the associations during the duration of the session 605.

In some embodiments, the context evaluator 510 may generate or determine a risk score for the client 102 using the associated capabilities 625. The risk score may identify or indicate a degree or potential of a security threat posed by the client 102 in accessing the server 106, including the resources 560 thereon. Certain combinations of device profiles, application profiles, network profiles, configurations of protocol handlers, and other factors may lead to a higher security than other combinations. In some embodiments, the context evaluator 510 may determine the risk score in accordance with a function. The function may assign various values or weights to different capabilities 625, and the combination of these values and weights as specified by the function may yield the risk score. Upon determination, the context evaluator 510 may store and maintain the risk score onto the database 530. In some embodiments, the context evaluator 510 may store an association between the risk score with the client 102, the agent 540 on the client 102, the session 605 established between the client 102 and the appliance 200, or the virtual desktop 615 provided to the client 102.

Figure 6B:
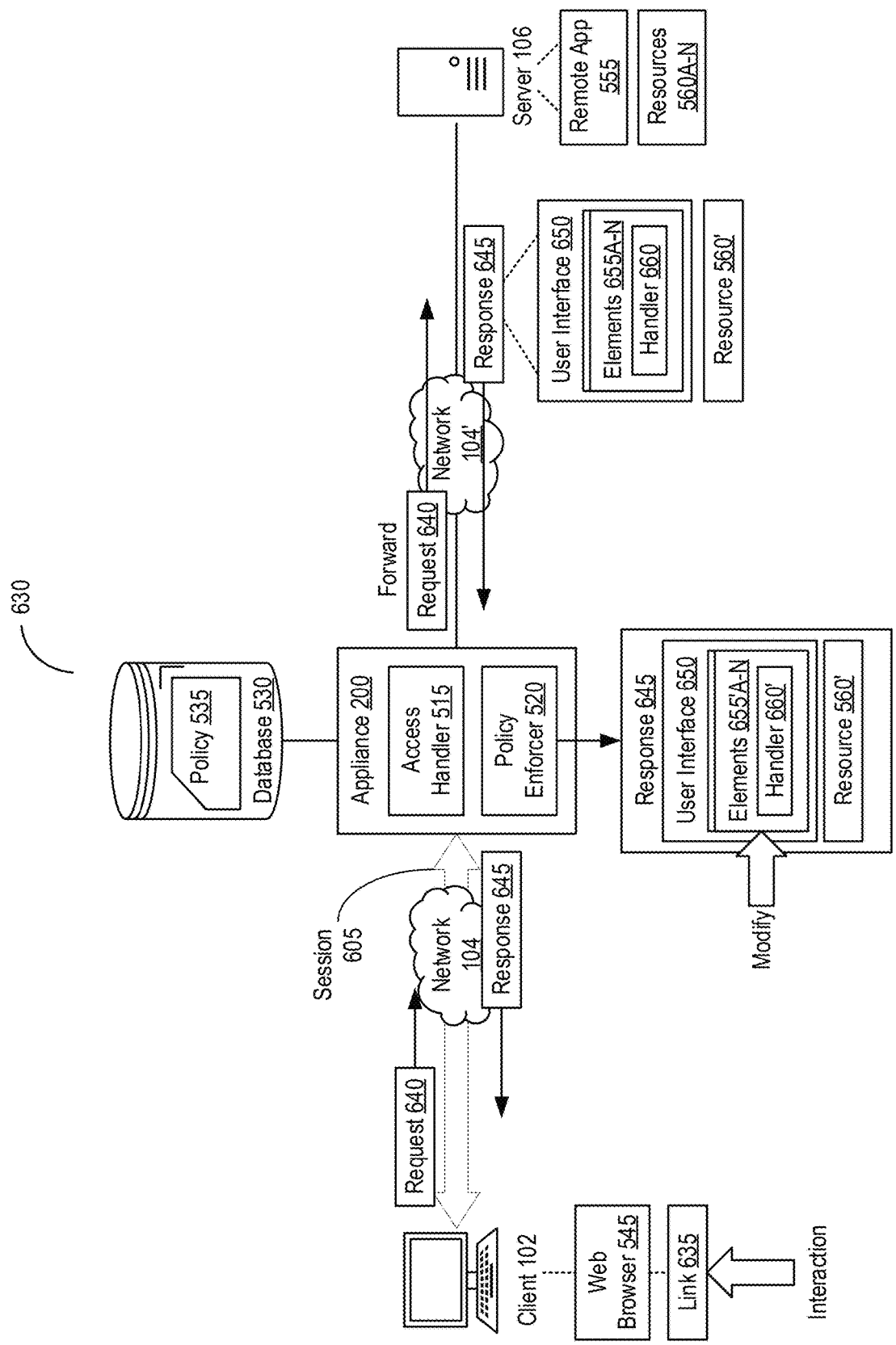
FIG. 6B is a block diagram of an embodiment of a process for modifying elements in the system for protecting access in accordance with an illustrative embodiment.

Referring now to FIG. 6B, depicted is a block diagram of a process 630 for modifying elements in the system 500 for protecting access. The process 630 may correspond to or include operations performed in the system 500 to request and retrieve resources 560 on the server 106. The web browser 545 on the client 102 may access and load webpages for presentation. Each webpage may include a script in accordance with a markup language, such as Hypertext Markup Language (HTML) (e.g., HTML5) or Extensible Markup Language (XML). In some embodiments, the web browser 545 may be within the virtual desktop 615 provided to the agent 540 by the appliance 200. In some embodiments, the web browser 545 may be outside the virtual desktop 615 and local to the client 102. When outside the virtual desktop 615, the web browser 545 may access the appliance 200 via the session 605.

Under the process 630, the web browser 545 on the client 102 may retrieve, identify, or otherwise receive at least one link 635 for accessing at least one resource 560 on the server 106. The link 635 may identify or include an identifier (e.g., a URL) referencing the resource 560 and the remote application 555 (or the local application 550) with which to access the resource 560. In some embodiments, the link 635 may also identify the appliance 200 via which access the resource 560 and the server 106 on which the resource 560 is hosted. For example, the link 635 may include a substring corresponding to the server 106, another substring corresponding to the remote application 555, and another substring corresponding to the resource 560. The link 635 may be received from any source, such the appliance 200 during the session 605, the server 106 via the appliance 200, or another device communicatively coupled with the client 102. For example, the web browser 545 may access a document management service to retrieve a webpage including the link 635. The link 635 may be located in an element of the webpage, such as a body element, a paragraph element, and an inline frame, among others. The link 635 may reference a document corresponding to one of the resources 560 on the server 106 and may identify the remote application 555 with which to access the resource 560. The web browser 545 may then display the webpage on the client 102.

The web browser 545 may provide, send, or otherwise transmit a request 640 to access the resource 560 to the appliance 200. The request 640 may be generated in accordance with an HTML web request to retrieve the resource 560. With receipt, the web browser 545 may monitor for an interaction with the link 635. Upon detection of the link 635, the web browser 545 may generate the request 640 using the link 635. The request 640 may include the identifier from the link 635, including referencing the resource 560 and the remote application 555 with which to access the resource 560. In some embodiments, the request 640 may include the identifier referencing the appliance 200 and the server 106. With the generation, the web browser 545 may transmit the request 640 to the appliance 200. When the web browser 545 is separated from the virtual desktop 615, the web browser 545 may direct the request 640 to the appliance 200 through the session 605. When the web browser 545 is within the virtual desktop 615, the web browser 545 may provide the request 640 to the agent 540 to forward the request 640 to the appliance 200 through the session 605.

The access handler 515 on the appliance 200 may in turn retrieve, identify, or otherwise receive the request 640 from the client 102. In some embodiments, the access handler 515 may intercept the request 640 while directed to the server 106. The access handler 515 may parse the request 640 to extract or identify the identifier referencing the resource 560 and the remote application 555. In some embodiments, the access handler 515 may also identify the identifier referencing the server 106 on which the resource 560 is hosted from the request 640. From the parsing, the access handler 515 may select or identify the server 106 to which to forward the request 640 based on the identifier referencing the server 106. In some embodiments, the access handler 515 may identify the server 106 based on the remote application 555 identified in the request 640. With the identification, the access handler 515 may forward, send, or otherwise transmit the request 640 to the server 106.

The server 106 may retrieve, identify, or otherwise receive the request 640 forwarded by the appliance 200 from the client 102. Upon receipt, the server 106 may parse the request 640 to extract or identify the identifier referencing the resource 560 and the remote application 555. From the parsing, the server 106 may find, select, or otherwise identify the resource 560 identified in the request 640 (denoted as resource 560'). As discussed above, the resource 560 may include data, text, image, video, audio, other data, or any combination thereof. The server 106 may also identify the remote application 555 with which to access the resource 560'. In some embodiments, the server 106 may use the identifier from the request 640 to identify the remote application 555. The remote application 555 may be a web application to be provided and loaded on the web browser 545 on the client 102.

With the identification of the remote application 555, the server 106 may also identify a user interface 650 for the remote application 555. The remote application 555 may have the user interface 650 via which to detect an invocation (e.g., in the form of a user input) and run various processes or functions in response to the invocation. The user interface 650 may identify or include one or more elements 655A-N (hereinafter generally referred to as elements 655). Each element 655 may correspond to a component of the user interface 650 to run a corresponding function in response to an invocation to the element 655. At least one of the elements 655 may contain or include at least one handler 660 (sometimes herein referred to as a protocol handler). The handler 660 may specify or define the function for the element 655 in response to the invocation. In some embodiments, the handler 660 may specify that the element 655 is to modify, access, or otherwise perform a corresponding operation on the resource 560'. For example, the handler 660 for at least one of the elements 655 may specify that the resource 560' is to be opened using a desktop application, such as one native to the virtual desktop 615 or the local application 550. The handler 660 may specify that one or more arguments are to be passed to the desktop application to access the resource 560'.

As the remote application 555 is a web application, the user interface 650 may be in the form of a webpage. The webpage constituting the remote application 555 may include a script in accordance with a markup language, such as HTML or XML. Each element 655 may correspond to a document objection model (DOM) tree element on the webpage. For example, the DOM tree element for the element 655 may include a head element, a body element, an image element, an inline frame element, a script element, and an object element, among others. The DOM tree elements corresponding to the elements 655 may be arranged in a hierarchy (e.g., a tree structure) in the webpage for the user interface 650 of the remote application 555. The handler 660 included in the element 655 may correspond to a script or a set of instructions within the DOM element corresponding to the element 655.

With the identifications, the server 106 may produce or generate at least one response 645 to send to the appliance 200. The response 645 may include a script in accordance with a HTML web response to provide the requested resource 560'. The server 106 may include the user interface 650, including the elements 655 and the handlers 660 therein, into the response 645. The server 106 may also include the resource 560' identified by the request 640 into the response 645. The server 106 may include the identifier for the appliance 200 or the client 102 from which the request 640 originated into the request 640. Upon generation, the server 106 may return, send, or otherwise transmit the response 645 to the appliance 200.

The access handler 515 on the appliance 200 may retrieve, identify, or otherwise receive the response 645 from the server 106. With receipt, the access handler 515 may parse the response 645 to extract or identify the user interface 650. From parsing, the access handler 515 may also identify the elements 655 in the user interface 650. In some embodiments, the access handler 515 may identify at least one element 655 for accessing the resource 560' via the desktop location. The identified element 655 may have the label text "Open in Desktop App." The access handler 515 may identify the handler 660 from at least one of the elements 655. With the identifications, the access handler 515 may provide one or more of the elements 655 to the policy enforcer 520 to check against the policy 535 to protect access to the server 106.

In conjunction, the policy enforcer 520 may store and maintain the policy 535 onto the database 530. The policy 535 may define or specify one or more rules to control, regulate, or protect the accessing of the resources 560' on the server 106 from the client 102, through the virtual desktop 615 via the agent 540 or the web browser 545, based on the capabilities 625. The rule may specify a modification to the one or more elements 655 or one or more handlers 660 in the user interface 650, depending on a set (or combination) of capabilities 625 associated with the client 102. The modification may include removal, disabling, hiding, or replacement of the identified element 655 or the handler 660 in the user interface 650. The policy 535 may be set or configured by an administrator of the appliance 200, the remote application 555, the server 106, or the network 104 or 104' among others.

The rules of the policy 535 may specify various modifications based on the capabilities 625 associated with the client 102. If the capabilities 625 indicates that the client 102 is a managed device, the policy 535 may maintain the element 655 for accessing of the resource 560 via the local application 550. If the capabilities 625 indicates that the client 102 is a personal device and is not using the virtual desktop 615, the policy 535 may specify that an element 655 for accessing the resource 560 via the local application 550 is to be disabled. The policy 535 may also specify that the element 655 (or the handler 660) is to be replaced with another element 655 to access the resource 560 through the virtual desktop 615. In some embodiments, the policy 535 may specify that a parent element (e.g., a parent DOM tree element) or a grandparent element (e.g., the parent or the parent DOM tree element) to which the element 655 is a child element is to be disabled, replaced, or hidden. The policy 535 may also include the substitute element 655 to replace the original element 655.

Continuing on, if the capabilities 625 indicates that the client 102 is a personal device and is using the virtual desktop 615, the policy 535 may specify that an element 655 for accessing the resource 560 via the local application 550 is to be disabled, removed, or hidden. If the capabilities 625 indicates that the client 102 is attempting to access the resource 560 through the virtual desktop 615 and another application is available within the virtual desktop 615, the policy 535 may specify that an element 655 (or the handler 660) for accessing the resource 560 via the local application 550 is to be modified to access the resource 560 via the application in the virtual desktop 615. If the capabilities 625 indicates that the client 102 is accessing through the web application as no local application 550 to access the resource 560 is installed on the client 102, the policy 535 may specify that the element 655 (or the handler 660) is to be modified that the virtual desktop 615 is to be launched to access the resource 560.

The rules of the policy 535 may specify modifications based on other factors. For example, if the handler 660 is the default protocol handler (e.g., as provided by the remote application 555), the policy 535 may specify that the handler 660 is to be disabled, hidden, or replaced with another handler 660. For example, the default protocol handler (e.g., "ms-word," "ms-powerpoint," and "ms-excel") may specify accessing of the resource 560' via the originally specified service outside of the server 106 or the appliance 200. The new handler 660 may specify that the resource 560' is to be accessed via the appliance 200.

In some embodiments, the rules of the policy 535 may specify the modifications based on the risk score determined using the capabilities 625 associated with the client 102. The policy 535 may define or identify a threshold value for the risk value at which to perform the modification. If the risk score is above threshold value, the policy 535 may specify that the element 655 (or the handler 660) for accessing the resource 560 via the local application 550 is disabled, removed, or hidden. If the risk score is below threshold value, the policy 535 may specify that the element 655 (or the handler 660) for accessing the resource 560' via the local application 550 is maintained.

The policy enforcer 520 on the appliance 200 may identify or determine whether one or more of the elements 655 (or one or more of the handlers 660) are to be modified. The determination may be based on the capabilities 625 associated with the client 102 in accordance with the policy 535. The policy enforcer 520 may check the capabilities 625 against the specifications as defined in the rules of the policy 535. In some embodiments, the policy enforcer 520 may also use the other factors (e.g., the handler 660 in the response 645 and the risk score) in checking against the policy 535. By checking with the policy 535, the policy enforcer 520 may find or identify the rule specified for the capabilities 625.

If the rule indicates the element 655 (or handler 660) is to be maintained, the policy enforcer 520 may determine that the corresponding handler 660 is to be maintained. In some embodiments, if the risk score is below the threshold value specified by the policy 535, the policy enforcer 520 may determine that the corresponding handler 660 is to be maintained. Conversely, if the rule indicates the element 655 (or handler 660) is to be modified, the policy enforcer 520 may determine that the corresponding element 655 is to be modified. In some embodiments, if the risk score is above the threshold value specified by the policy 535, the policy enforcer 520 may determine that the corresponding handler 660 is to be modified. In some embodiments, the policy enforcer 520 may associate the capabilities 625 with the modification as specified by the policy 535 to be performed on the element 655 or the handler 660 in the user interface 650.

When the element 655 is determined to be modified, the policy enforcer 520 may modify the element 655 to further protect access to the server 106. The modification may be in accordance with the capabilities 625 associated with the client 102 as specified by the policy 535. When the policy 535 specifies removal, the policy enforcer 520 may remove or delete the identified element 655. When the policy 535 specifies hiding, the policy enforcer 520 may set a visibility property of the element 655 to null, transparent, or otherwise hidden. When the policy 535 specifies disabling, the policy enforcer 520 may disable invocation of the element 655. When the policy 535 specifies replacing, the policy enforcer 520 may change or substitute the element 655 originally in the response 645 with the element 655 provided by the policy 535. From modifying, the policy enforcer 520 may configure the element 655 to produce, yield, or otherwise generate a corresponding modified element 655' in accordance with the policy 535.

In some embodiments, the policy enforcer 520 may modify the handler 660 in the element 655' determined to be modified. The policy enforcer 520 may extract or identify the handler 660 included in the element 655' from the response 645 received from the server 106. The handler 660 may be originally defined to access the resource 560' via another server besides the server 106. For instance, the default handler 660 may identify that the client 102 is to access the resource 560' via the document management service different from the server 106. With the identification, the policy enforcer 520 may modify the handler 660' in accordance with the policy 535.

When the policy 535 specifies removal, the policy enforcer 520 may remove or delete the identified handler 660. When the policy 535 specifies hiding, the policy enforcer 520 may set a visibility property of the handler 660 to null, transparent, or otherwise hidden. When the policy 535 specifies disabling, the policy enforcer 520 may disable the invocation of the handler 660. When the policy 535 specifies replacing, the policy enforcer 520 may change or substitute the handler 660 originally in the response 645 with the handler 660 provided by the policy 535. From modifying, the policy enforcer 520 may configure the handler 660 to produce, yield, or otherwise generate a corresponding modified handler 660' in accordance with the policy 535.

With the determination, the policy enforcer 520 may forward, send, or otherwise transmit the response 645 from the server 106 to the client 102. If any modifications were performed, the response 645 may include the modified element 655' with the modified handler 660' of the user interface 650 for the remote application 555 (e.g., as depicted). If no modifications were made, the response 645 may include the original elements 655 with the original handler 660 of the user interface 650 for the remote application 555. When the web browser 545 is within the virtual desktop 615, the policy enforcer 520 may provide the response 645 via the virtual desktop 615 for the session 605. When the web browser 545 is outside the virtual desktop 615, the policy enforcer 520 may provide the response 645 via the session 605 or connection over the network 104.

The web browser 545 on the client 102 may in turn retrieve, identify, or otherwise receive the response 645 from the appliance 200. Upon receipt, the web browser 545 may execute and process the response 645 in accordance with the script (e.g., HTML). The web browser 545 may load the user interface 650 of the remote application 555 (e.g., in the form of a web application) for presentation. The web browser 545 may also load the requested resource 560' in the response 645 for display. In processing, the web browser 545 may parse the response 645 to extract or identify the user interface 650. From the user interface 650, the web browser 545 may identify the one or more elements 655 for presentation.

Figure 6C:
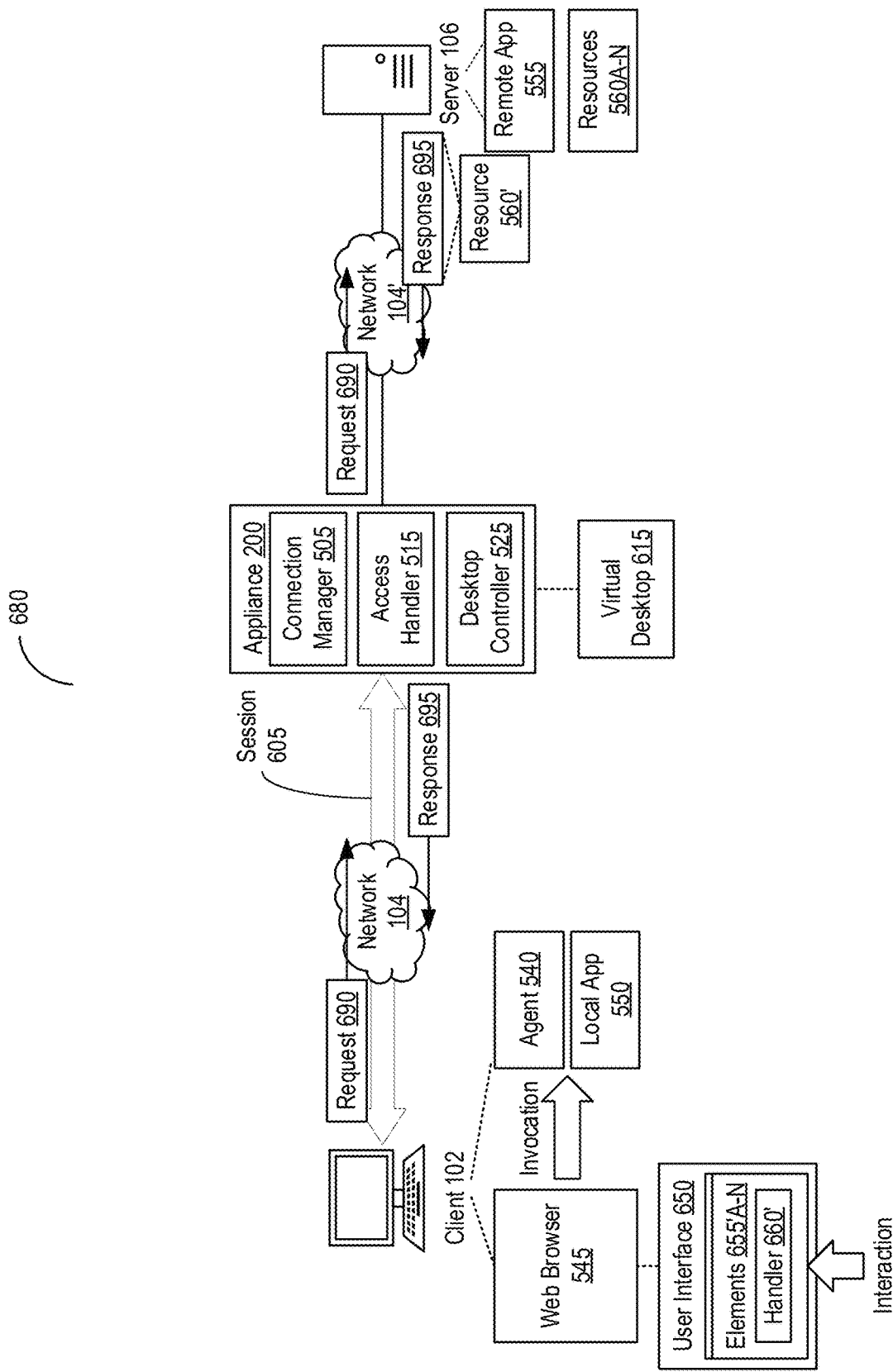
FIG. 6C is a block diagram of an embodiment of a process for invoking elements in the system for protecting access in accordance with an illustrative embodiment.

Referring now to FIG. 6C, depicted is a block diagram of a process 680 for invoking elements in the system 500 for protecting access. The process 680 may correspond to or include operations performed in the system 500 once a modified element 655' is invoked. Under the process 680, the web browser 545 may monitor for an invocation on the elements 655' (or the element 655) of the user interface 650 for the remote application 555. The element 655' may have been a replacement of the element 655 originally in the response 695, as opposed to a disabling, removal, or hiding of the element 655. The invocation may correspond to a user interaction by the user of the client 102. Upon detection on the element 655', the web browser 545 may process the invocation in accordance with the function as defined by the handler 660' in the element 655'. The element 655' may be to access the resource 560' via another application outside the web browser 545, such as the application native to the virtual desktop 615 or the local application 550 on the client 102. The handler 660' in the element 655' may identify which application outside the remote application 555 in the web browser 545 is to be called to access the resource 560.

When the function in the handler 660' specifies invocation of the local application 550 on the client 102, the web browser 545 may call or invoke the local application 550. The local application 550 may be outside the virtual desktop 615. In accordance with the handler 660', the web browser 545 may pass the specified arguments to the local application 550 to access the resource 560' from the server 106. The local application 550 may be native to the client 102, and may have access to the session 605 between the client 102 and the appliance 200. The arguments may include an identifier (e.g., URL) for the resource 560' on the server 106. In some embodiments, the arguments may include an identifier for the remote application 555 to be used to access the resource 560'. The passing may be facilitated by an operating system on the client 102. Upon passing, the local application 550 may provide, transmit, or otherwise send a request 690 for the resource 560'. The request 690 may include the identifier referencing the resource 560'.

The access handler 515 on the appliance 200 may in turn retrieve, identify, or otherwise receive the request 690 from the client 102. In some embodiments, the access handler 515 may intercept the request 690 while directed to the server 106. The access handler 515 may parse the request 690 to extract or identify the identifier referencing the resource 560'. With the identification, the access handler 515 may forward, send, or otherwise transmit the request 690 to the server 106.

The server 106 may retrieve, identify, or otherwise receive the request 690 forwarded by the appliance 200 from the client 102. Upon receipt, the server 106 may parse the request 690 to extract or identify the identifier referencing the resource 560'. From the parsing, the server 106 may find, select, or otherwise identify the resource 560' identified in the request 690. With the identification, the server 106 may return, send, or transmit a response 695 including the resource 560' to the appliance 200. The access handler 515 may retrieve, identify, or receive the response 695 from the server 106. The access handler 515 may in turn forward the response 695 to the client 102. The local application 550 on the client 102 may load the resource 560' in the response 695.

Conversely, when the function in the handler 660' specifies invocation of an application in the virtual desktop 615, the web browser 545 may call or invoke the agent 540. An application within the virtual desktop 615 provided through the agent 540 may be used to access the resource 560'. In accordance with the handler 660', the web browser 545 may pass the specified arguments to the agent 540. The arguments may include an identifier for the remote application 555 within the virtual desktop 615 to be used to access the resource 560'. The agent 540 may have access to the session 605 between the client 102 and the appliance 200. The arguments may include an identifier (e.g., URL) for the resource 560' on the server 106. The passing may be facilitated by an operating system on the client 102. Upon passage, the agent 540 may check or determine whether the virtual desktop 615 has been created for the session 605. In determining, the agent 540 may inspect the session 605 to identify the virtual desktop 615.

If a virtual desktop 615 has not been created, the agent 540 may request the connection manager 505 to instantiate the virtual desktop 615 in a similar manner as discussed above in connection with process 600. In response to the interaction with the modified element 655' and the passage of the arguments, the agent 540 may generate a request 690 to connect with the appliance 200. The request 690 may identify that the virtual desktop 615 is to be created for the session 605. Furthermore, the request 690 may identify the remote application 555 and the resources 560' as identified in the arguments. The remote application 555 may be a virtualized application native to the virtual desktop 615, and the request 690 may indicate that the remote application 555 is to be loaded onto the virtual desktop 615. With the generation, the agent 540, may transmit, provide, or otherwise send the request 690 to the appliance 200.

The connection manager 505 on the appliance 200 may in turn retrieve, identify, or otherwise receive the request 690 from the client 102. Upon receipt, the connection manager 505 may complete the establishment of the session 605 between the client 102 and the appliance 200, if previously not established. In addition, the connection manager 505 may provide the virtual desktop 615 via the session 605 for the agent 540. In some embodiments, the connection manager 505 may select an already existing virtual desktop 615. In some embodiments, the connection manager 505 may instantiate, launch, or otherwise create the virtual desktop 615 for the client 102. With the establishment of the session 605 and the provision of the virtual desktop 615, the agent 540 may receive and load the virtual desktop 615 on the client 102.

In conjunction, the desktop controller 525 on the appliance 200 may launch the remote application 555 identified by the request 690 within the virtual desktop 615 via which to access the resource 560'. The desktop controller 525 may also parse the request 690 to extract or identify the identifier referencing the resource 560' to be loaded in the remote application 555 within the virtual desktop 615. From the parsing, the desktop controller 525 may select or identify the server 106 to which to forward the request 690 based on the identifier referencing the server 106. In some embodiments, the desktop controller 525 may identify the server 106 based on the remote application 555 identified in the request 690. With the identification, the desktop controller 525 may forward, send, or otherwise transmit the request 690 to the server 106.

The server 106 may retrieve, identify, or otherwise receive the request 690 forwarded by the appliance 200 from the client 102. Upon receipt, the server 106 may parse the request 690 to extract or identify the identifier referencing the resource 560'. From the parsing, the server 106 may find, select, or otherwise identify the resource 560' identified in the request 690. With the identification, the server 106 may return, send, or transmit a response 695 including the resource 560' to the appliance 200. The desktop controller 525 may retrieve, identify, or receive the response 695 from the server 106. The desktop controller 525 may in turn load the resource 560' within the response 695 into the remote application 555 in the virtual desktop 615. The desktop controller 525 may provide the remote application 555 with the resource 560' to the client 102 via the virtual desktop 615 of the session 605.

In this manner, the appliance 200 may protect and control access to the resources 560 hosted on the server 106 by modifying the elements 655 of the user interface 650 in accordance with the policy 535 and the capabilities 625 of the client 102. The modification of the elements 655 may thus serve to improve the security of the server 106 and the data integrity of the resources 560 hosted thereon. Since the access controls defined by the policy 535 can be more widely applied, the appliance 200 may allow the resources 560 to be accessed by a greater number of clients 102 from disparate environments, while maintaining security over the data. The overall utility of the client 102 may also be improved, as the user of the client 102 can access the resources 560, without being on a pre-approved network or having a managed device provided by an enterprise.

Figure 7A:
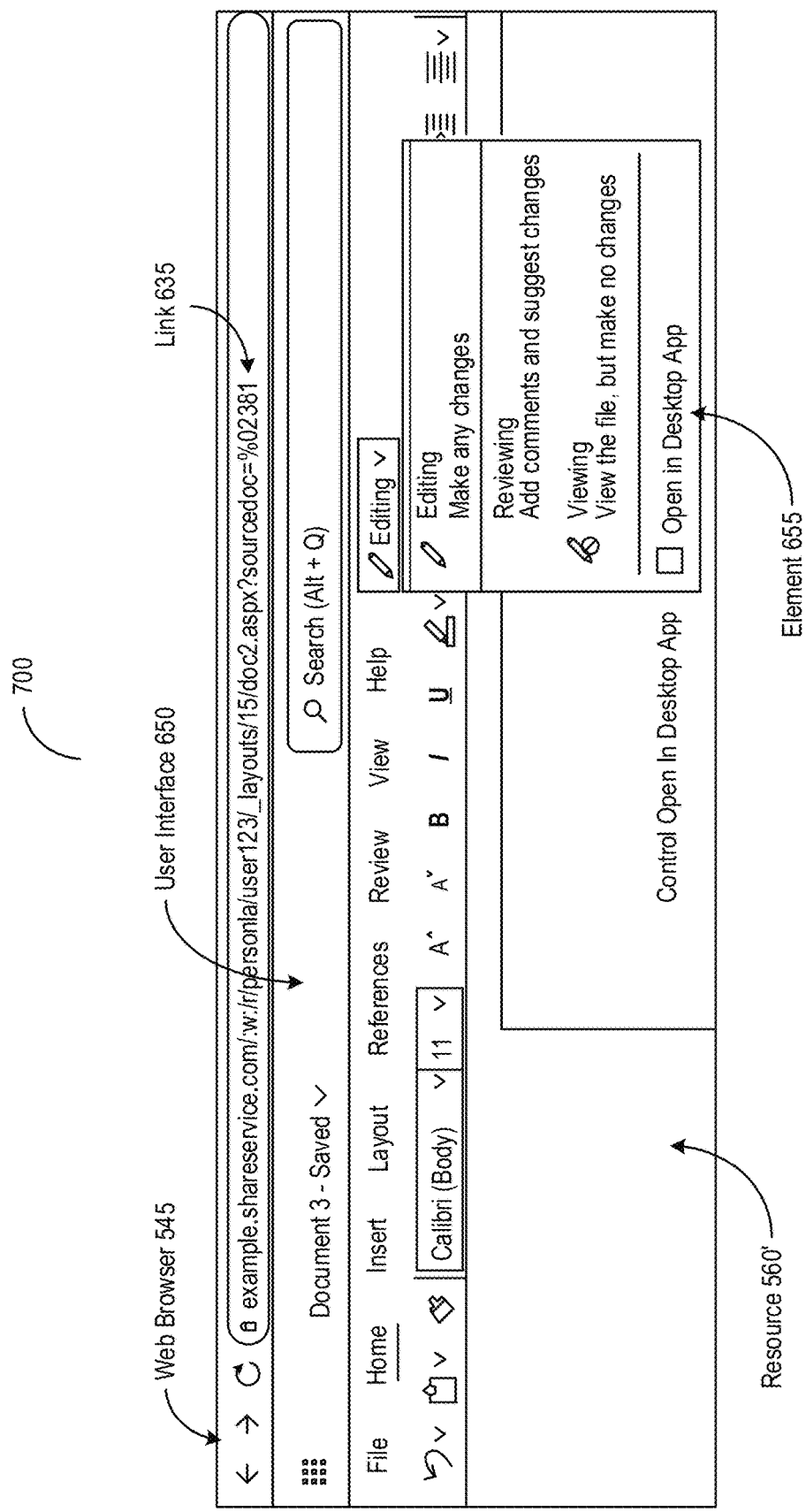
FIG. 7A is a screenshot of an example display of a user interface of a web application in the system for protecting access in accordance with an illustrative embodiment.

Referring now to FIG. 7A, depicted is a screenshot of an example display 700 of a user interface 650 of a web application (e.g., the remote application 555) in the system 500 for protecting access. As depicted, the display 700 may include the web browser 545 containing the link 635 to the resource 560' and the user interface 650 of the remote application 555 in the form of the web application. The user interface 650 in the display 700 may include the element 655 without any modifications. In context of the system 500, the policy enforcer 520 may have permitted the element 655 to be maintained in accordance with the policy 535 based on the capabilities 625 of the client 102, in which the display 700 is presented.

Figure 7B:
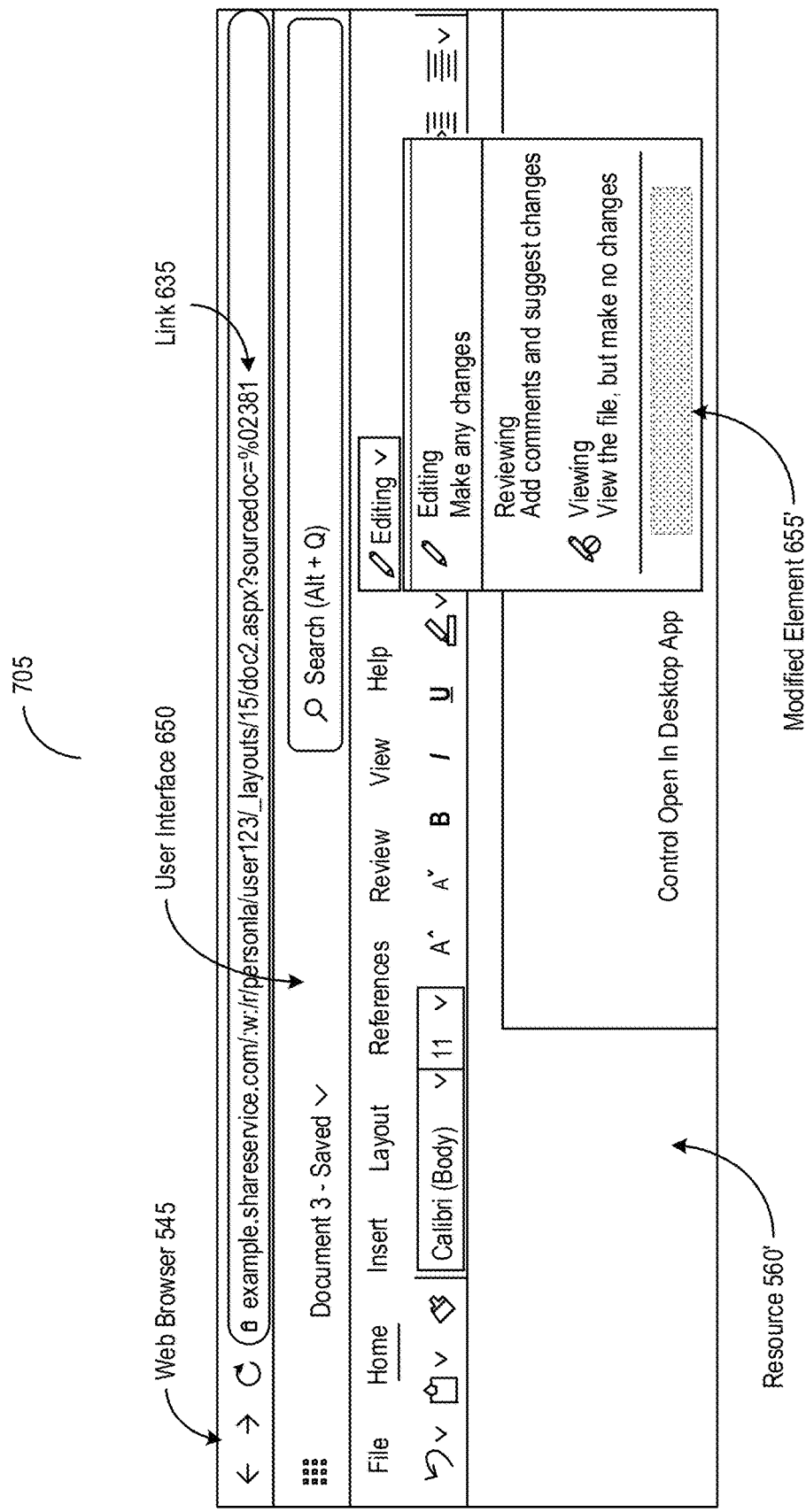
FIG. 7B is a screenshot of an example display of a user interface of a web application with a modified interface element in the system for protecting access in accordance with an illustrative embodiment.

Referring now to FIG. 7B, depicted is a screenshot of an example display 705 of a user interface 650 of a web application (e.g., the remote application 555) with a modified interface element 655' in the system 500 for protecting access. As depicted, the display 705 may include the web browser 545 containing the link 635 to the resource 560' and the user interface 650 of the remote application 555 in the form of the web application. The user interface 650 in the display 700 may include the element 655' modified to be hidden (e.g., as depicted). In context of the system 500, the policy enforcer 520 may have modified the element 655 in accordance with the policy 535 based on the capabilities 625 of the client 102, in which the display 700 is presented.

Figure 8A:
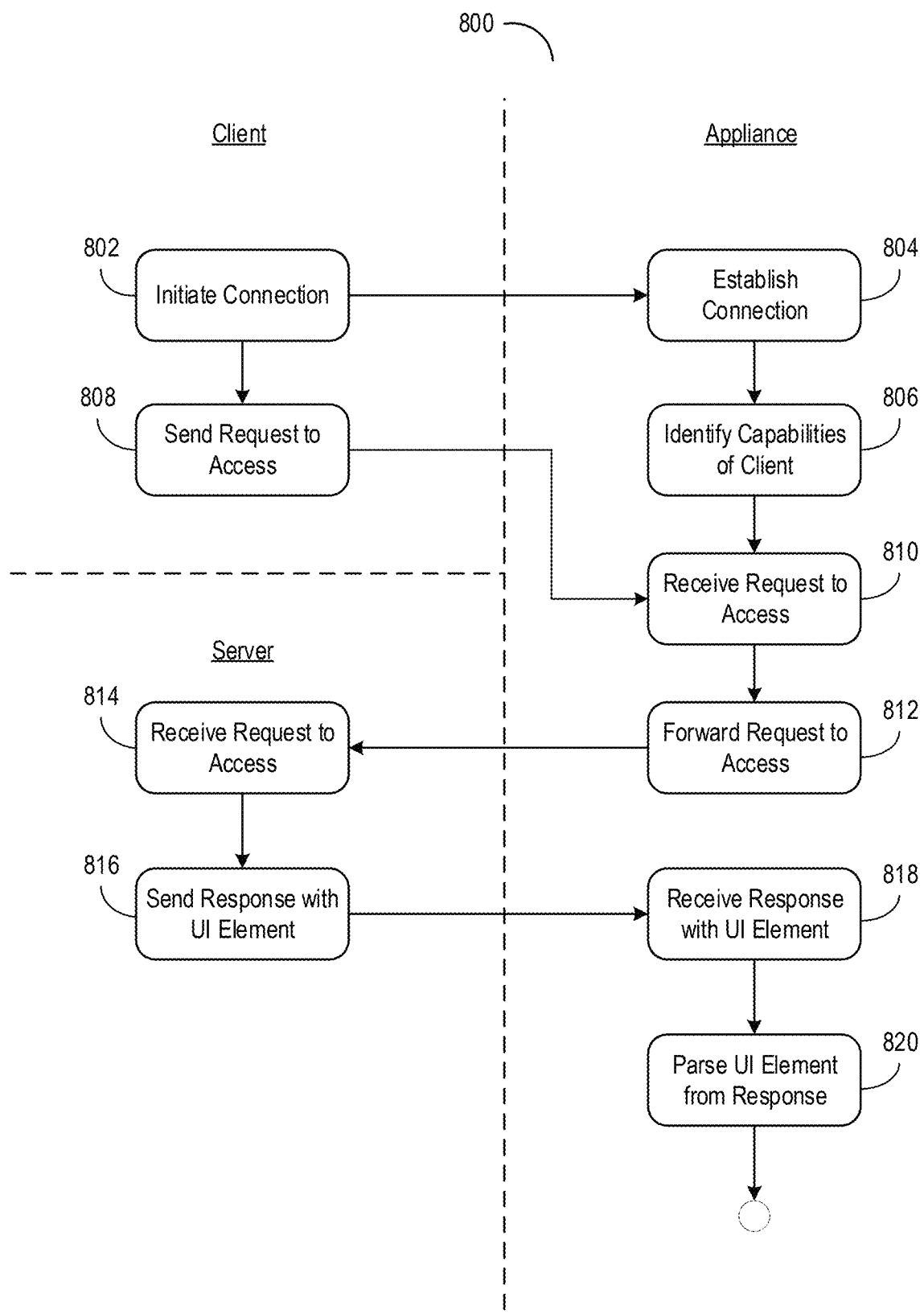
FIGS. 8A and 8B are flow diagrams of an embodiment of a method of protecting access by clients to server-hosted resources in accordance with an illustrative embodiment.
Figure 8B:
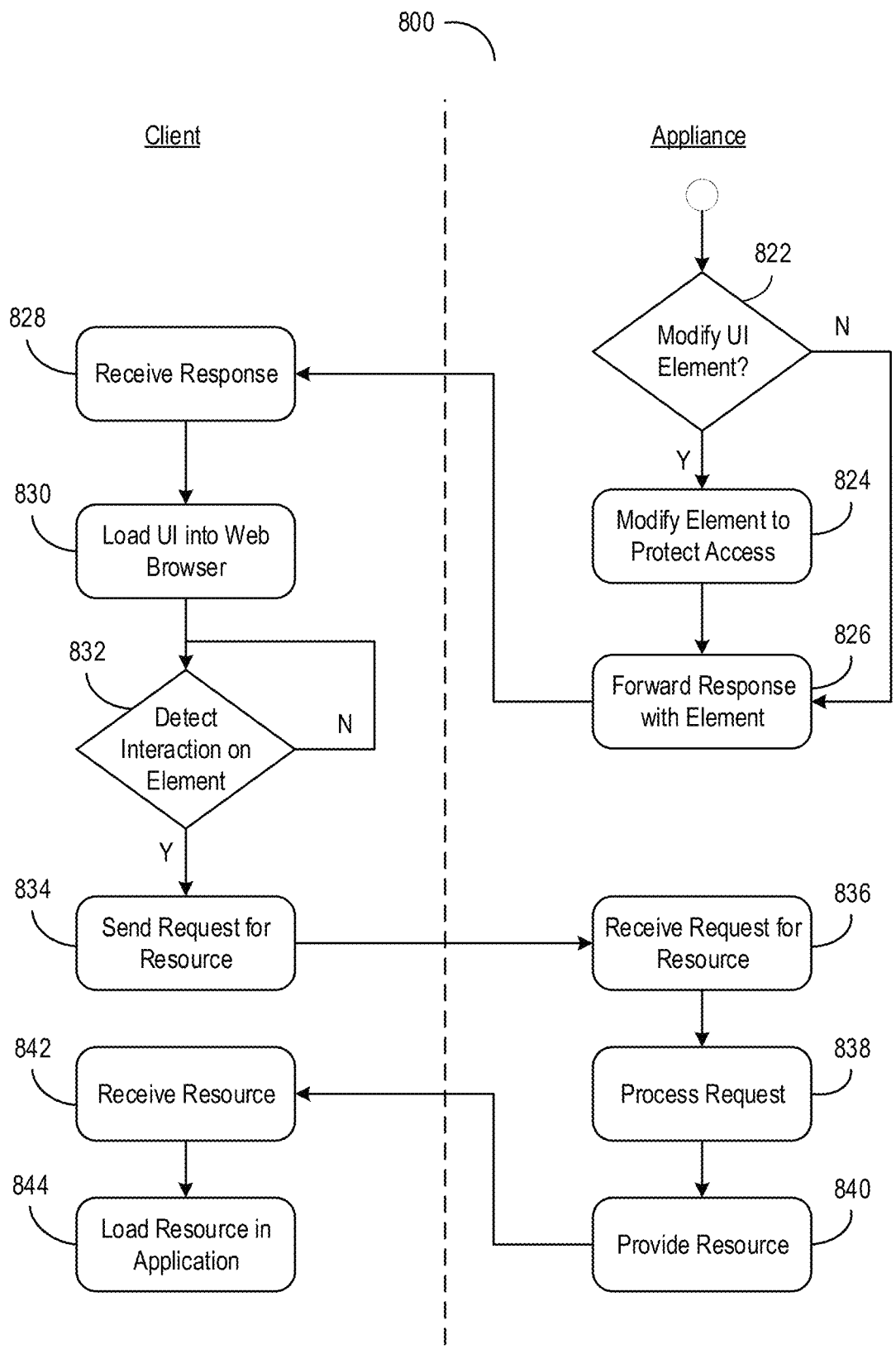

Referring now to FIGS. 8A and 8B, depicted is a flow diagram for a method 800 of protecting access by clients to server-hosted resources. The functionalities of method 800 may be implemented using, or performed by, the components described in FIGS. 1A-6C, such as the client 102, the server 106, and the appliance 200. Under the method 800, a client (e.g., the client 102) may initiate connection (802). An appliance (e.g., the appliance 200) may establish the connection (804). The appliance may identify the capabilities (e.g., the capabilities 625) of the client (806). The client may send a request to access (808). The appliance may receive the request to access (810). The appliance may forward the request to access (812). A server (e.g., the server 106) may receive the request to access (814). The server may send a response including a user interface element (e.g., the elements 655) (816). The appliance may receive the response including the user interface element (818). The appliance may parse the user interface element from the response (820)

Moving on, the appliance may determine whether the user interface element is to be modified (822). If the user interface element is determined to be modified, the appliance may modify the element to protect access (824). The appliance may forward the response including the user interface element including any modifications (826). The client may receive the response including the user interface element (828). The client may load the user interface element on a web browser (e.g., the web browser 545) (830). The client may detect an interaction on the user interface element (832). If the interaction is detected, the client may send a request for the resource (834). The appliance may receive the request for the resource (836). The appliance may process the request (838). The appliance may provide the requested resource (840). The client in turn may receive the resource (842). The client may load the resource in an application (e.g., the local application 550 or the remote application 555).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus, or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of protecting access to a server, comprising:
   identifying, by a device intermediary to a client and a server, a capability of the client to protect access to the server via an application;
   determining, by the device, that an element of a user interface provided by the application to the client is to be modified based at least on the capability;
   modifying, by the device responsive to the determination, the element of the user interface to further protect access to the server in accordance with the capability; and
   providing, by the device, the modified element to the client for the user interface of the application.

2. The method of claim 1, further comprising establishing, by the device, a session between the client and the server to provide the client access to a resource via the application hosted on the server, in response to an interaction with the modified element.

3. The method of claim 1, further comprising associating, by the device, the capability of the client with a modification to be performed on the user interface element of the user interface for the application.

4. The method of claim 1, further comprising determining, by the device, a risk score for the client in protecting access to the server via the application, and wherein determining that the element is to be modified further comprises determining that the element is to be modified, responsive to the risk score being above a threshold.

5. The method of claim 1, wherein identifying the capability further comprises identifying the capability including at least one of:
   a device profile of the client, an application profile of the application, a network profile of a network with which the client is connected, or a configuration of a handler on the client.

6. The method of claim 1, wherein determining that the element is to be modified further comprises identifying, in a response from the server to the client, a handler defining a function of the element to access a second server different from the server.

7. The method of claim 1, wherein modifying the element further comprises modifying a handler defining a function of the element by at least one of removal, hiding, disabling, or replacing the handler.

8. The method of claim 1, wherein modifying the element further comprises configuring the element of the user interface of the application hosted on the server to further protect access to a resource hosted on the server by at least one of removal, hiding, disabling, or replacing the element.

9. The method of claim 1, wherein providing the modified element further comprises forwarding, from the server to the client, a response including the modified element of the user interface for the application.

10. The method of claim 1, further comprising providing, by the device responsive to an invocation of the modified user interface element, the client access to a resource via the application hosted on the server.

11. A system for protecting access to a server, comprising:
    a device intermediary to a client and a server, the device having one or more processors and a memory storing instructions which, when executed by the one or more processors, configure the device to:
    identify a capability of the client to protect access to the server via an application;
    determine that an element of a user interface provided by the application to the client is to be modified based at least on the capability;
    modify, responsive to the determination, the element of the user interface to further protect access to the server in accordance with the capability; and
    provide the modified element to the client for the user interface of the application.

12. The system of claim 11, wherein the device is further configured to establish a session between the client and the server to provide the client access to a resource via the application hosted on the server, in response to an interaction with the modified element.

13. The system of claim 11, wherein the device is further configured to:
    determine a risk score for the client in protecting access to the server via the application, and determine that the element is to be modified, responsive to the risk score being above a threshold.

14. The system of claim 11, wherein the device is further configured to identify the capability including at least one of:
    a device profile of the client, an application profile of the application, a network profile of a network with which the client is connected, or a configuration of a handler on the client.

15. The system of claim 11, wherein the device is further configured to modify a handler defining a function of the element by at least one of removal, hiding, disabling, or replacing the handler.

16. The system of claim 11, wherein the device is further configured to provide, responsive to an invocation of the modified user interface element, the client access to a resource via the application hosted on the server.

17. The system of claim 11, wherein the device is further configured to configure the element of the user interface of the application hosted on the server to further protect access to a resource hosted on the server by at least one of removal, hiding, disabling, or replacing the element.

18. A non-transitory computer readable medium storing program instructions for causing one or more processors intermediary to a client and a server to:
    identify a capability of the client to protect access to the server via an application;
    determine that an element of a user interface provided by the application to the client is to be modified based at least on the capability;
    modify, responsive to the determination, the element of the user interface to further protect access to the server in accordance with the capability; and
    provide the modified element to the client for the user interface of the application.

19. The non-transitory computer readable medium of claim 18, wherein the program instructions further cause the one or more processors to:
    determine a risk score for the client in protecting access to the server via the application, and determine that the element is to be modified, responsive to the risk score being above a threshold.

20. The non-transitory computer readable medium of claim 18, wherein the program instructions further cause the one or more processors to modify a handler defining a function of the element by at least one of removal, hiding, disabling, or replacing the handler.

* * * * *